US006741971B1

(12) United States Patent
Duval et al.

(10) Patent No.: US 6,741,971 B1
(45) Date of Patent: May 25, 2004

(54) SELF-CONTAINED MULTI-FUNCTION SYSTEM FOR PREPARING MAIL

(75) Inventors: Hervé Duval, Sceaux (FR); Fidel Peralle, Viroflay (FR)

(73) Assignee: Neopost Industrie, Bagneux (FR)

( * ) Notice: Subject to any disclaimer, the term of this patent is extended or adjusted under 35 U.S.C. 154(b) by 0 days.

(21) Appl. No.: 09/467,246

(22) Filed: Dec. 20, 1999

(30) Foreign Application Priority Data

Jan. 29, 1999 (FR) .......................................... 99 01020

(51) Int. Cl.[7] .......................... G07B 17/00; G06F 7/00

(52) U.S. Cl. ...................... 705/401; 705/408; 705/410; 700/220; 700/227

(58) Field of Search ................................ 705/401, 407, 705/410, 408, 28; 700/220, 223, 227, 90

(56) References Cited

U.S. PATENT DOCUMENTS

| | | | | |
|---|---|---|---|---|
| 3,750,167 A | | 7/1973 | Gehman et al. | |
| 3,858,381 A | * | 1/1975 | Huber et al. | 53/242 |
| 4,800,505 A | * | 1/1989 | Axelrod et al. | 705/407 |
| 4,853,869 A | * | 8/1989 | Durst et al. | 705/408 |
| 5,437,441 A | * | 8/1995 | Tuhro et al. | 705/408 |
| 5,569,327 A | * | 10/1996 | Paradis et al. | 118/253 |
| 5,628,249 A | * | 5/1997 | Cordery et al. | 53/284.3 |
| 5,675,650 A | * | 10/1997 | Cordery et al. | 705/60 |
| 5,684,705 A | * | 11/1997 | Herbert | 705/401 |
| 5,727,890 A | * | 3/1998 | Stodder et al. | 346/134 |
| 5,754,434 A | * | 5/1998 | Delfer et al. | 700/223 |
| 6,026,385 A | * | 2/2000 | Harvey et al. | 705/401 |
| 6,366,827 B2 | * | 4/2002 | Krasuski et al. | 700/220 |

FOREIGN PATENT DOCUMENTS

| | | | |
|---|---|---|---|
| EP | 0 265 192 A2 | | 4/1988 |
| EP | 0 512 543 A2 | | 11/1992 |
| EP | 0 745 435 A2 | | 12/1996 |
| FR | 2825228 | * | 11/2002 |

OTHER PUBLICATIONS

Scisco, Pete "Making labels with a computer", Mar. 1999, Office Systems v16n3, pp. 33–37.*

* cited by examiner

*Primary Examiner*—John G. Weiss
*Assistant Examiner*—Richard Woo
(74) *Attorney, Agent, or Firm*—Sughrue Mion, PLLC

(57) ABSTRACT

A self-contained multi-function system for preparing mail items, the system comprising a general-purpose computer for preparing a document to be sent and for preparing secure postage metering or "franking" information, a digital imaging device connected to the general-purpose computer so as to print both the document to be sent, and at least a destination address for the document but not the postage imprint on an envelope that is to receive the document, and a folder/inserter connected both to the digital imaging device and to the general-purpose computer so as to receive and fold the printed document, and, once the document has been inserted in the envelope, so as to affix the postage imprint selectively by performing a write operation in a writable microcircuit of an electronic tag carried by the envelope or by the document. The digital imaging device may further include an optical read module for making it possible to digitize documents inserted directly into the digital imaging device, and a fax-sending module for enabling documents that have been previously digitized by the optical read module to be transmitted directly over a communications network.

18 Claims, 4 Drawing Sheets

SELF-CONTAINED MULTI-FUNCTION SYSTEM FOR PREPARING MAIL

TECHNICAL FIELD

The present invention relates to the field of mail handling, and more particularly to apparatus for preparing a mail item fully, ready for posting, from creating the document to printing the postage on or "franking" the envelope into which the document is inserted.

PRIOR ART

The market currently offers no system in an office environment that is completely self-contained and that prepares mail items fully, ready for posting.

The Applicant's European Patent Application EP 0 612 036 proposes a mail-handling system that folds documents delivered directly by a word-processing system and inserts them into envelopes. However, it is possible to send the resulting mail item only if the envelope bears the destination address and the right amount of postage, which means that, at the very least, a postage meter must be added to the system.

European Patent Application EP 0 265 192 discloses a mail-handling system associating the following around a central computer (system controller): firstly a laser printer followed by a folder/inserter for folding documents and inserting them into envelopes, and secondly an ink jet printer for printing the destination addresses on the envelopes. It should be noted that such a system does not print postage amounts on the resulting mail items. Furthermore, printing addresses directly on envelopes containing documents suffers from drawbacks (with respect to printing quality) due to the different thicknesses of the envelopes.

The problem of printing quality is solved in Patent Application EP 0 745 435 by printing the envelopes before the documents are inserted into them. The empty envelopes are printed by an ink jet printer, with the documents being printed independently by a laser printer. However, the system for preparing mail items described in that document remains complex, in particular with respect to the paths followed by the mail items, and it requires a number of components such that it cannot be used in practice in an office environment in which inevitably only a small amount of space is available.

Those are the main reasons that led the Applicant to file Patent Application No. 97 11798 which describes a system enabling a mail item to be handled fully and implementing a single digital printer for printing both the document and the envelope, including printing of the postage imprint. Unfortunately, while being generally satisfactory, that system suffers from two drawbacks. The first drawback comes from the fact that the encoding of the postage imprint, which is necessary to guarantee the security of the metering data and which busies the single printer for a length of time that can be long (e.g. when a two-dimensional bar code is displayed), results in a reduction in the maximum handling speed of the system as whole. In addition, in the event of a document jam in the folding and insertion module, the recording of the metering characteristics that has been performed in parallel with the prior printing of the postage imprint at the print module of the printer must then be cancelled in order to prevent erroneous accounting of the mail items actually posted. The postal authorities have no way of verifying that the cancelled mail item has not been sent fraudulently, except by insisting that one of their employees intervene for each incident.

OBJECTS AND DEFINITION OF THE INVENTION

The present invention proposes a system that is fully self-contained, that is very simple to use in a conventional office environment, and that is designed to handle a mail item fully, from compiling the individual documents forming the mail item to sealing the mail item so that it can be posted, and including folding documents and inserting them into an envelope, printing all of the appropriate information on the envelope, in particular the destination address, and affixing the postage imprint. An object of the invention is to provide a system that enables high handling rates to be achieved. Another object of the invention is to propose a system which limits the possibilities of fraud when a mail item is incompletely, e.g. when there is a document jam.

These objects are achieved by a self-contained multi-function system for preparing mail items, the system comprising a general-purpose computer for preparing a document to be sent and for preparing secure postage metering or "franking" information, a digital imaging device connected to the general-purpose computer so as to print both the document to be sent, and at least a destination address for the document but not the postage imprint on an envelope that is to receive the document, and a folder/inserter connected both to the digital imaging device and to the general-purpose computer so as to receive and fold the printed document, and, once said document has been inserted in the envelope, so as to affix the postage imprint selectively by performing a write operation in a writable microcircuit of an electronic tag carried by the envelope or by the document.

Thus, with the structure of the invention, all of the functions required for preparing a mail item are performed very simply by means of a conventional imaging device associated with a computer and with a folder/inserter. In addition, since the postage imprint is affixed by electronic marking at the end of the cycle only, it is possible to avoid fraud on the postage amounts which are thus recorded only once the mail item has been fully formed.

The imaging device includes envelope feed means, unprinted document feed means, a print module connected either to the envelope feed means or to the document feed means so as to print successively the envelope and the documents, and a document outlet connected to the print module so as to deliver the printed envelopes and the printed documents to the folder/inserter, a control module also being provided for controlling printing of and synchronizing conveying of the envelopes and documents as a function, in particular, of instructions received from the general-purpose computer.

The folder/inserter includes an accumulator module connected to a document inlet designed to co-operate with the document outlet of said digital imaging device so as to store, when necessary, the various documents corresponding to a given envelope, a fold module connected either to the document inlet or to the accumulator module to fold the documents before they are inserted into the envelope, a turn-around module connected to the document inlet so as to receive and position the envelope so that the documents can be inserted therein, an inserter module connected to the fold module and to the turn-around module so as to insert the documents into the corresponding envelope, and an electronic marking module disposed at the outlet of the inserter module so as to perform the write operation in the writable microcircuit of the electronic tag carried by the envelope or by the documents, before ejecting the resulting mail item to a document outlet, a control module also being provided for controlling and synchronizing the various modules as a function, in particular, of instructions received from the general-purpose computer.

Preferably, the digital imaging device further includes an optical read module for making it possible to digitize documents inserted directly into said device, and a fax-sending module for enabling documents that have been previously digitized by said optical read module to be transmitted directly over a communications network.

Advantageously, a first document-receiving tray may be provided at the outlet of the print module so as to receive printed documents that are not to be sent.

The print module of said digital imaging device may include one of the following two elements: a laser print drum or an ink jet print head.

Advantageously, the folder/inserter may further include an additional feed module for feeding in advertising leaflets.

In an advantageous embodiment of the invention, the digital imaging device and the folder/inserter form a common assembly.

BRIEF DESCRIPTION OF THE DRAWINGS

Other characteristics and advantages of the present invention appear more clearly from the following description given by way of non-limiting example and with reference to the accompanying drawings, in which.

DETAILED DESCRIPTION OF A PREFERRED EMBODIMENT

Figure 1:
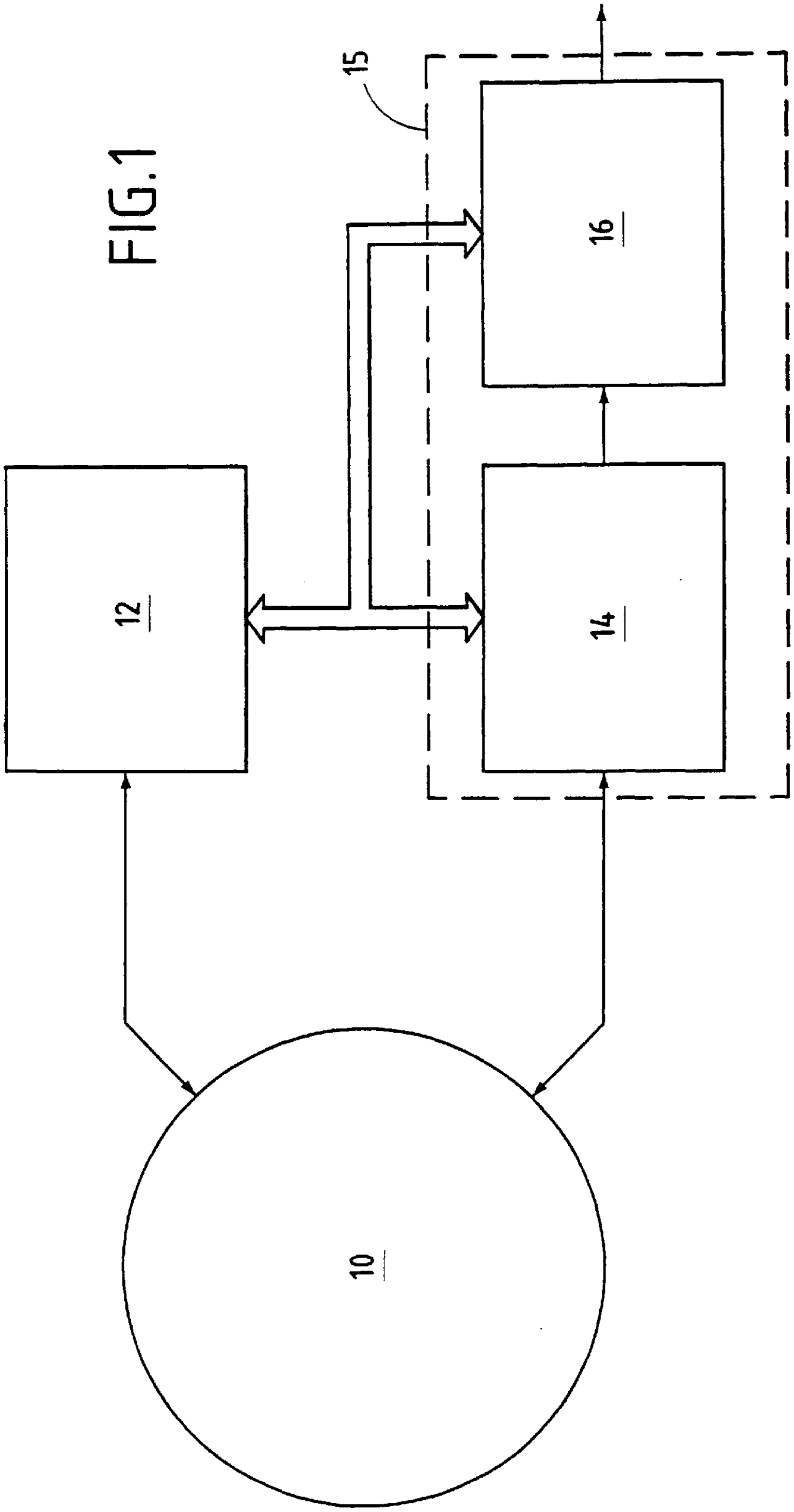
FIG. 1 is a diagram showing a self-contained multi-function system of the invention for preparing mail.

FIG. 1 is a a diagrammatic view of a self-contained multi-function system of the invention for preparing mail. The system may be connected to an external communications network 10 of the switched telephone network (STN) type or of the Integrated Services Digital Network (ISDN) type, and it is made up of three main components that co-operate with one another, namely a computer or micro-computer 12, a digital imaging device 14 and a folder/inserter 16.

The computer 12 is a general-purpose computer, e.g. a computer of the PC type or the like (but a workstation or network computer may also be suitable), conventionally including a central processing unit to which program memories (e.g. of the ROM or EEPROM type), data memories (of the RAM type or the like), and a plurality of input/output modules are connected via standardized link buses. The modules conventionally serve as interfaces between the central processing unit of the computer and various associated peripherals, such as a keyboard, a pointer unit (in particular a trackball or a mouse), a display terminal (e.g. a plasma or liquid crystal display), a data storage device (a hard disk or a CD-ROM), a modulator/demodulator (of the analog type or of the modem-cable type depending on the nature of the link to the network 10), the digital imaging device, and the folder/inserter.

The computer further includes software means firstly for performing the various metering functions (advantageously secured by means of suitable enciphering software) generally associated with a conventional postage meter or "franking machine", and secondly for performing conventional functions of transmitting and receiving facsimiles (faxes), of processing documents (in particular graphics documents), and of receiving and sending electronic mail (e-mail) over the worldwide network referred to as the "Internet".

The digital imaging device 14 is a multi-function general-purpose device for performing an advantageously-color printing function of the laser type or ink-jet type, an advantageously-color digitizing function, and a fax-sending function. It is implemented very conventionally in self-contained mode or from the computer 12 by using software means that are known per se. In particular, outside its mail-preparing function, this device can be used firstly like any document-printing terminal in association with commercially-available standard software such as Word, Excel, or Access, for example (that software being sold by Microsoft Corporation) installed in the computer 12. In self-contained mode, it can also be used like any color digitization terminal (scanner) or like any color document reproduction terminal (photocopier). In addition, by means of its fax-sending function, it can also be used like a facsimile machine using digitized documents directly.

In the invention, some of the documents that need to be printed, or preferably the envelopes, are pre-equipped with an electronic tag containing a writable microcircuit (also referred to as a "transponder") in which, by a write operation using a suitable write device, it is possible to write various information, including secure franking information, such information then being read directly by the postal authorities by means of a suitable contact-free read device.

The folder/inserter 16 may be a conventional folder/inserter of the type described in the Applicant's Patent EP 0 352 692 and to which specific envelope-feed and electronic-marking modules are added for feeding in the envelopes and for making it possible to perform the above-mentioned write operation that is necessary to affix the postage imprint, or else the folder/inserter may be specially designed for the mail preparation system of the invention, as explained in more detail below.

Figure 2:
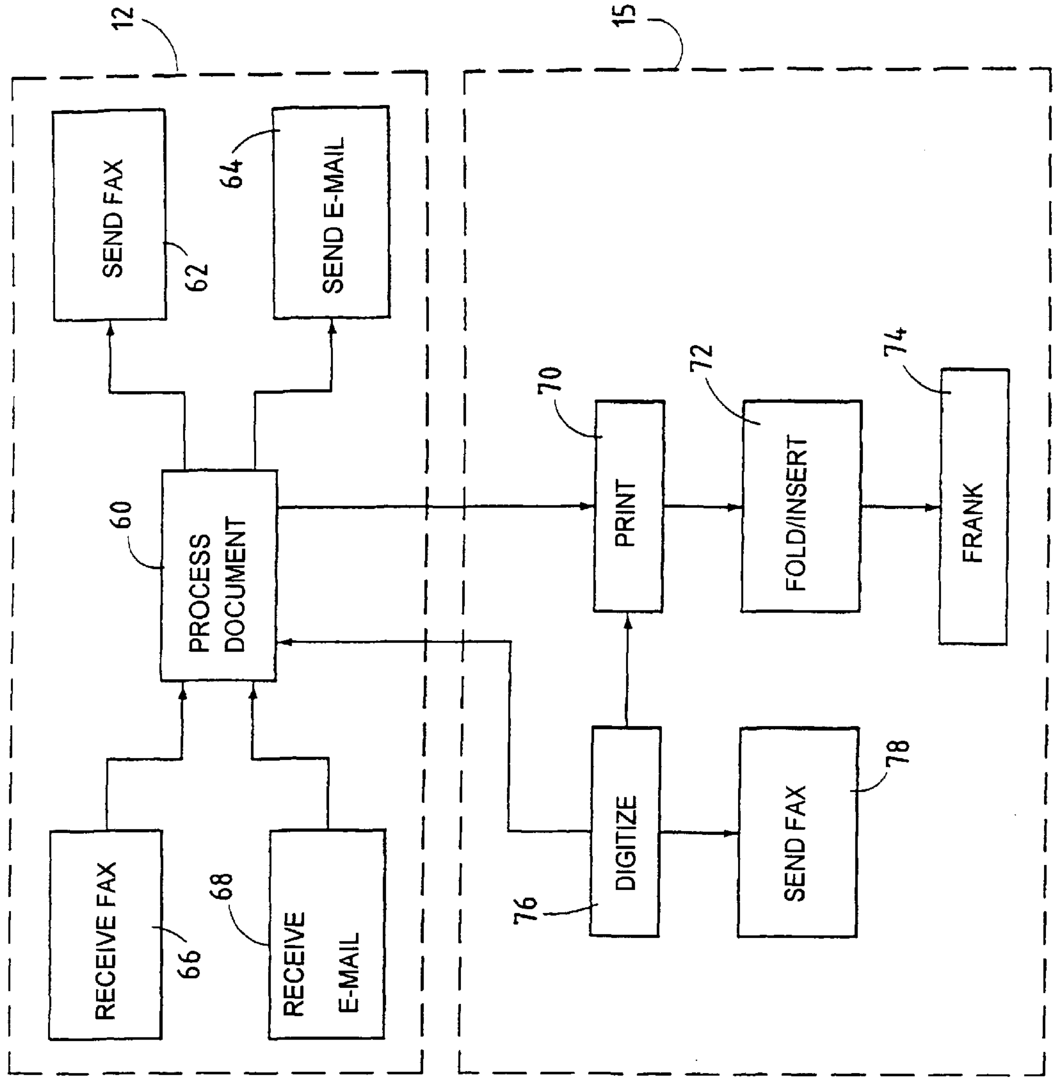
FIG. 2 shows the various functions performed by the system shown in FIG. 1.

The various functions that can be performed by the self-contained multi-function system of the invention for preparing mail are now summarized with reference to FIG. 2. At the computer 12, the functions performed are essentially constituted by processing the document and the envelope 60, i.e. initially preparing the document (typing it with graphics elements being added if necessary), making any modifications to it, and sending it over the communications network 10 in the form of a fax 62 or of e-mail 64, as well as entering the envelope data (destination, sender, etc.), but not the data relating to the postage imprint. The document may however also come from the communications network directly by fax 66 or by e-mail 68, and optionally also be re-processed 60. The resulting document, as received directly or as re-processed may then be printed 70 on the digital imaging device 14, then folded and inserted into an envelope 72, and then franked 74 so that it can be posted. The printing 70 may also be performed directly on the basis of a digitized document 76 in the device 14, which digitized document may be sent immediately by fax 78 or else be addressed to the computer 12 so as to be sent by e-mail or so as to be re-processed 60.

Figure 3:
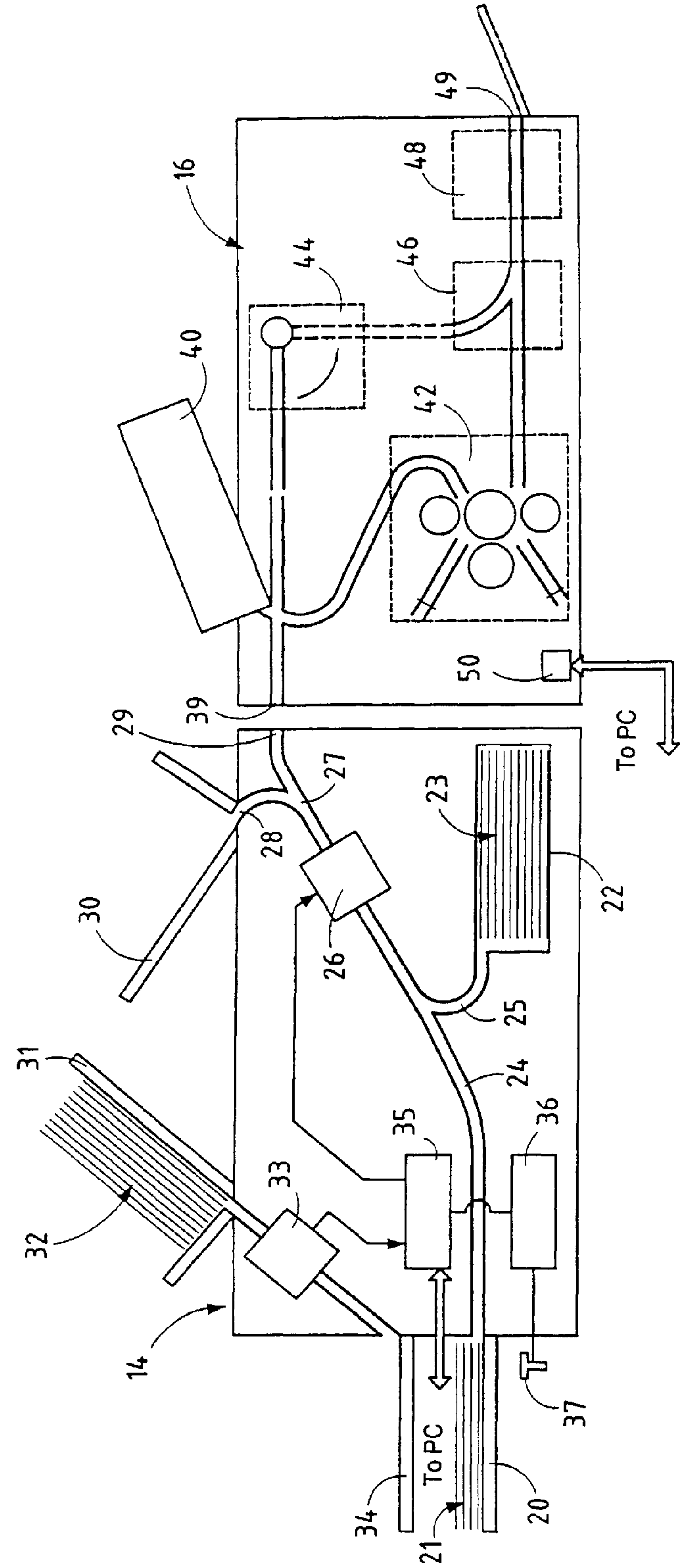
FIG. 3 shows the paths followed by a mail item in two of the essential components of the system shown in FIG. 1.

FIG. 3 is a more detailed view of the hardware structures of the digital imaging device 14 and of the folder/inserter 16, and it shows diagrammatically the various possible paths followed by the mail items through these two essential components of the apparatus.

The device 14 is conventionally provided with first feed means 20 for receiving empty envelopes 21, and with second feed means 22 for receiving blank paper on which documents 23 are to be printed. The first feed means may, for example, be in the form of an external loading tray, and the second feed means may conventionally be in the form of a slot-in side-loading magazine. Respective document paths 24,25 make it possible to convey the envelopes and the paper to a print module 26 (the conveyor rollers and the motors for driving them are not shown). The print module is advantageously constituted either by a print drum (for a laser printer) or by a thermal print head (for an ink jet printer). At the outlet of the print module, a document path 27 makes it possible to direct the printed object (envelope or document) to one or other of the two outlets 28, 29 of the device. The first outlet 28 makes it possible to feed a receiving tray 30 (conventionally placed on top of the device) for receiving the printed documents when the device is used conventionally in self-contained mode (scanner or copier function) or in association with the general-purpose computer 12 (printer function), the second document outlet 29 (advantageously placed at the back of the digital imaging device) serving to feed the folder/inserter directly via its document inlet. The device 14 is further provided with third feed means, e.g. in the form of an external front-loading tray 31 for receiving the documents to be digitized 32. After going past an optical read module 33, these documents are then available on a front portion of the device on a second receiving tray 34. Naturally, a control module 35 (advantageously having a microprocessor) is provided in the device for the purpose of controlling both the digitization (in association with the module 33) and also the printing (in association with the module 26), and for the purpose of synchronizing conveying of the documents and envelopes. The control module is provided with an external link to the computer 12, and it also drives an internal modulator/demodulator 36 in association with the communications network 10 via a specialized jack 37.

The folder/inserter 16 is essentially made up of five modules. The first module 40 is a document accumulator placed at a document inlet 39 (disposed facing the outlet 29 of the device 14) and it serves to store various documents that need to be put in the same envelope. The second module 42 is a conventional fold module provided with pockets or "buckle chutes" and receiving the documents to be folded either directly from a document inlet 39 (when the envelope is to contain only one document) or from the document accumulator 40. The third module 44 is a special turn-around module designed to change the position of the envelope to facilitate inserting the documents into the envelope. At the outlet of the imaging device 14, the envelopes are conventionally positioned lengthwise, whereas the documents must be inserted widthwise. The Applicant's Patent Application No. 97 11797 entitled "Dispositif de réorientation d'enveloppes" ("An envelope reorientation device") illustrates an embodiment of such a module. The fourth module 46 is a conventional inserter module which receives the empty envelope and the documents to be inserted therein, and performs the insertion. Finally, in order to perform the "printing" of the postage imprint, the folder/inserter is provided with a fifth module 48 which is an electronic marking module that is disposed at the output of the inserter module and that "affixes the postage imprint" by writing certain items of secure franking information delivered by the computer 12 in a microcircuit of an electronic tag carried by the envelope or the document (operation of activating the transponder). The resulting sealed and correctly-franked mail item is then ejected to a document outlet 49. For reasons of simplification, the secondary modules have not been shown, although they are part of such a folder/inserter. For example, such secondary modules are constituted by a moistening module which sticks down the flaps of the envelopes after insertion, and by an additional advertising-leaflet feed module. Naturally, like the device 14, the folder/inserter 16 is provided with a control module 50 for controlling the conveying and folding of documents, the conveying and turning around of envelopes, the insertion of the documents into the corresponding envelopes, on the basis of instructions received from the computer 12, and the affixing of the postage imprint by activating the transponder.

Figure 4:
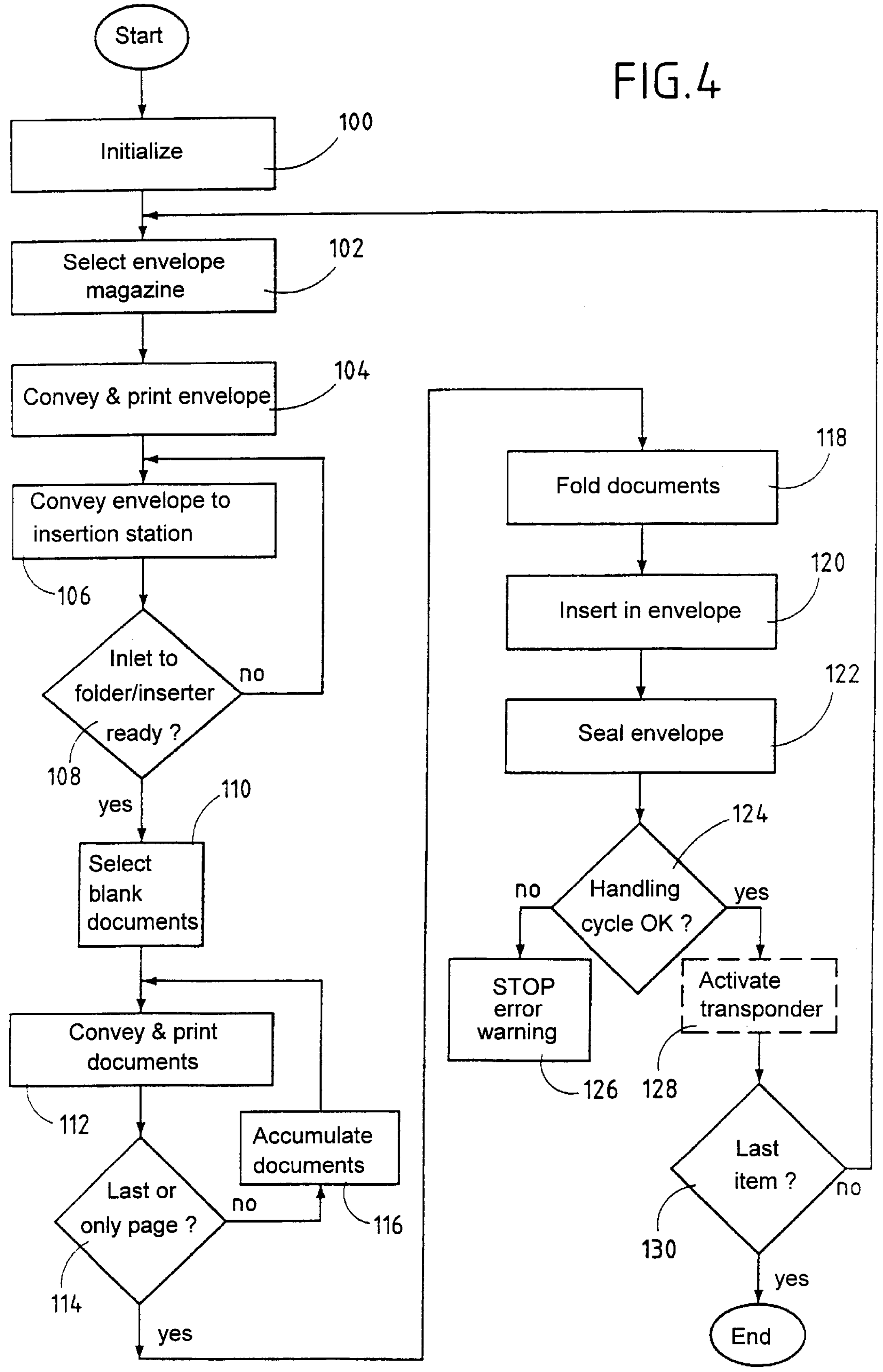
FIG. 4 is a flow chart explaining the main operating steps of the system of the invention.

Operation of the system of the invention is explained below with reference to FIG. 4 which is a flow chart showing the operations to be performed in order to prepare a mail item.

After an initialization step 100 in which the various parameters of the system are re-initialized, a step 102 is performed in which the magazine 20 containing the empty envelopes 21 is selected. An envelope is then conveyed and printed in a step 104. At least the destination address is printed, but the postage imprint is not printed. In a step 106, the resulting printed envelope is conveyed via the device 14 and then via the folder/inserter to the inlet of the inserter module 46 thereof after it has been reoriented by the module 44. After a following step 108 of verifying that the inlet 39 of the folder/inserter is unoccupied, the tray 22 containing the blank documents 23 is selected in a step 110. A document is then conveyed and printed in a step 112. Depending on whether or not the printed document is the only document to be inserted into the envelope (test at step 114), the document is stored in the accumulator module 40 of the folder/inserter in a step 116. Once all of the documents corresponding to the envelope have been printed (the answer to the above-mentioned test 114 is "yes"), the document(s) is/are folded by the fold module 42 in a following step 118, and is/are then inserted into the envelope at the inserter module 46 (step 120). Finally, in a step 122, the resulting mail item is sealed by sticking down its flap. If, for example, the mail-handling cycle has been interrupted, such interruption is determined in a test 124 which then triggers alarms both at the folder/inserter and at the computer 12 (step 126), and causes the handling process to be stopped. If the mail item is handled without any incidents occurring (answer to the test in step 124 is "yes"), the postage information is then written on the item (by activating the transponder carried by the envelope or the document) in a step 128, then another test step 130 is performed to verify whether the handled mail item is the last item, in which case the mail item is ejected to the outlet of the folder/inserter 16 and the handling process is stopped, or whether other mail items are waiting to be prepared, in which case the process returns to step 102 in which the envelope tray is selected so as to prepare the following mail item.

It can be observed that depending on the origin of its creation, the document extracted from the magazine 22 may either be compiled internally in the device 14 on the basis of one or more documents as digitized by the optical reader 33, the digitization data then being sent to the print module 26 via the control module 35 which formats it for the purpose of printing it, or else it may be compiled using the computer 12 (or received by the computer from the communications network 10) and transmitted to the control module 35 of the device 14 so as to activate the print module 26. Multiple send combinations are thus possible. For example, a simple sequential mode may comprise the following succession of preparation cycles:

a) printing appropriate information data on the envelope using the print module 26, such data including a postal authorization number when an agreement exists with the postal authorities;

b) sending the printed envelope to the folder/inserter 16, where it awaits the documents to be inserted into it;

c) printing the above-mentioned documents that are initially prepared on the keyboard of the computer 12, and at the optical read module 33;

d) sending the documents to the folder/inserter 16 for the purpose of folding them and inserting them into the envelope;

e) optionally franking them by means of electronic marking using a transponder; and f) electronically transmitting the above-mentioned documents by fax or by e-mail.

The various functions performed by the present invention make it a genuine office automation machine, well suited to small entities and to a mail handling system for which it optimizes the performance/quality/price equation. Its electronic marking function for franking by means of transponders also gives it remarkable operating flexibility, and its digitization/fax-sending function enables it to copy at least twenty pages without manual intervention being necessary, and to transmit documents by fax or by e-mail. In an era in which the Internet and e-mail are becoming omnipresent, it is quite important to keep a written or printed record of electronic messages which are so quick and easy to send.

Thus, an order can be fulfilled and confirmed with invoicing by e-mail first, followed by traditional mail, while recording all of the transactions with invoicing on the computer.

A fax received at a hotel, for example, can be made confidential by it being put in an envelope automatically and immediately after it is received. Without having to use character-recognition expert software to identify the person to whom the fax is addressed, it is conceivable to digitize the top of the first received page so as to print it out or to copy it onto the envelope to be distributed, it then being possible for the format of the envelope to serve as a copy or print format. In which case, it is then not necessary to affix the postage imprint to it.

Likewise, in-house distribution within a firm or an administration requires no franking. In this other case, folding the document and putting it in an envelope procures the necessary confidentiality whether the mail comes from the computer by e-mail or by fax, or whether it comes from the digitization module, from a loading tray of the folder/inserter or simply from a combination of at least two of these elements.

Another interesting example of an application consists in preparing a mail shot on the computer once only, in digitizing documents such as images and photographs once only using the scanner, and in sending the resulting mail item to a large number of destination addresses. The invention then makes it possible transmit such mail items by fax or by e-mail, and to supplement such transmission by sending them by conventional mail.

Naturally, the present invention is not limited to the above-described preferred embodiment, and variants or additions may be considered without going beyond the ambit of the invention. It is possible to provide inscriptions other than the destination address or the sender's address, e.g. an advertising logo or utility information or event information. Similarly, the computer may also be connected to a remote postage-crediting station located on postal authority premises or on the premises of any other authorized body. It can also be noted that the digital imaging device 14 and the folder/inserter 16 may be integrated in a single assembly which is then in the form of a specific and self-contained office-automation machine 15 for preparing mail.

We claim:

1. A self-contained multi-function system for preparing documents and envelopes, at least one of said documents and envelopes being provided with an electronic tag with a writable microcircuit, the system comprising a general-purpose computer for preparing both the documents to be sent and the respective envelopes for said documents, said system further preparing secure postage metering or "franking" information for said at least one of the documents and the envelopes, said system further comprising a singular digital imaging device connected to the general-purpose computer so as to print both the documents and at least a destination address but not the postage imprint on the envelopes, and a folder/inserter connected both to the singular digital imaging device and to the general-purpose computer so as to receive and fold the printed document, and, once said document has been inserted in the envelope, so as to affix the postage imprint selectively by performing a write operation to one or both of the electronic tags carried by the envelope or the document.

2. A self-contained multi-function system for preparing documents and envelopes according to claim 1, wherein said singular digital imaging device includes an envelope feed means, unprinted document feed means, a print module connected both to the envelope feed means and to the document feed means, and a document outlet connected to the print module so as to deliver the printed envelopes and the printed documents to the folder/inserter, a control module also being provided for controlling printing of and synchronizing conveying of the envelopes and documents as a function from instructions received from the general-purpose computer.

3. A self-contained multi-function system for preparing documents and envelopes according to claim 2, wherein said singular digital imaging device further includes an optical read module for making it possible to digitize documents inserted directly into said device.

4. A self-contained multi-function system for preparing documents and envelopes according to claim 3, wherein said singular digital imaging device further includes a fax-sending module for enabling documents that have been previously digitized by said optical read module to be transmitted directly over a communications network.

5. A self-contained multi-function system for preparing documents and envelopes according to claim 2, wherein said singular digital imaging device further includes a first document-receiving tray at the outlet of the print module so as to receive printed documents that are not to be sent.

6. A self-contained multi-function system for preparing documents and envelopes according to claim 2, wherein said print module of said singular digital imaging device includes one of the following two elements: a laser print drum or an ink jet print head.

7. A self-contained multi-function system for preparing documents and envelopes according to claim 1, wherein said folder/inserter includes an accumulator module connected to a document inlet, said accumulator module connected to the document outlet of said singular digital imaging device so as to store the various documents corresponding to a given envelope, a fold module connected either to the document inlet or to the accumulator module to fold the documents before they are inserted into the envelope, a turn-around module connected to the document inlet so as to receive and position the envelope so that the documents are readied for insertion, an inserter module connected to the fold module and to the turn-around module so as to insert the documents into the corresponding envelope, and an electronic marking module disposed at the outlet of the inserter module so as to perform the write operation in the writable microcircuit of the electronic tag carried by the envelope or by the documents, before ejecting the resulting mail item to a document outlet, a control module also being provided for controlling and synchronizing the various modules as a function from instructions received from the general-purpose computer.

8. A self-contained multi-function system for preparing documents and envelopes according to claim 7, wherein said folder/inserter further includes an additional feed module for feeding in preprinted documents.

9. A self-contained multi-function system for preparing documents and envelopes according to claim 1, wherein the singular digital imaging device and the folder/inserter form a common assembly.

10. A self-contained multi-function system for preparing documents and envelopes, wherein said documents are provided with an electronic tag with a writable microcircuit, the system comprising a general-purpose computer for preparing both the documents to be sent and the respective envelopes for said documents, said system further preparing secure postage metering or "franking" information for said documents and envelopes, said system further comprising a digital imaging device connected to the general-purpose computer so as to print both the documents and at least a destination address but not the postage imprint on the envelopes, and a folder/inserter connected both to the digital imaging device and to the general-purpose computer so as to receive, fold and insert the printed documents within respective envelopes, said folder/inserter including an electronic marking module affixing the postage imprint selectively by performing a write operation to the electronic tag carried by the documents.

11. A self-contained multi-function system for preparing documents and envelopes according to claim 10, wherein said digital imaging device includes an envelope feed means, unprinted document feed means, a print module connected both to the envelope feed means and to the document feed means, and a document outlet connected to the print module so as to deliver the printed envelopes and the printed documents to the folder/inserter, a control module also being provided for controlling printing of and synchronizing conveying of the envelopes and documents as a function from instructions received from the general-purpose computer.

12. A self-contained multi-function system for preparing documents and envelopes according to claim 11, wherein said digital imaging device further includes an optical read module for making it possible to digitize documents inserted directly into said device.

13. A self-contained multi-function system for preparing documents and envelopes according to claim 12, wherein said digital imaging device further includes a fax-sending module for enabling documents that have been previously digitized by said optical read module to be transmitted directly over a communications network.

14. A self-contained multi-function system for preparing documents and envelopes according to claim 11, wherein said digital imaging device further includes a first document-receiving tray at the outlet of the print module so as to receive printed documents that are not to be sent.

15. A self-contained multi-function system for preparing documents and envelopes according to claim 11, wherein said print module of said digital imaging device includes at least one of a laser print drum and an ink jet print head.

16. A self-contained multi-function system for preparing documents and envelopes according to claim 10, wherein said folder/inserter includes an accumulator module connected to a document inlet, said accumulator module connected to the document outlet of said digital imaging device so as to store the various documents corresponding to a given envelope, a fold module connected either to the document inlet or to the accumulator module to fold the documents before they are inserted into the envelope, a turn-around module connected to the document inlet so as to receive and position the envelope so that the documents are readied for insertion, an inserter module connected to the fold module and to the turn-around module so as to insert the documents into the corresponding envelope before ejecting the resulting mail item to a document outlet, and a control module for controlling and synchronizing the various modules as a function from instructions received from the general-purpose computer.

17. A self -contained multi-function system for preparing documents and envelopes according to claim 16, wherein said folder/inserter further includes an additional feed module for feeding in preprinted documents.

18. A self-contained multi-function system for preparing documents and envelopes according to claim 10, wherein the digital imaging device and the folder/inserter form a common assembly.

* * * * *